US011952638B2

(12) United States Patent
Bastow-Cox et al.

(10) Patent No.: US 11,952,638 B2
(45) Date of Patent: Apr. 9, 2024

(54) DIRECT REDUCTION PROCESS UTILIZING HYDROGEN

(71) Applicant: Midrex Technologies, Inc., Charlotte, NC (US)

(72) Inventors: Keith Marshall Bastow-Cox, Charlotte, NC (US); Enrique Jose Cintron, Charlotte, NC (US); Gregory Darel Hughes, Charlotte, NC (US)

(73) Assignee: Midrex Technologies, Inc., Charlotte, NC (US)

(*) Notice: Subject to any disclaimer, the term of this patent is extended or adjusted under 35 U.S.C. 154(b) by 196 days.

(21) Appl. No.: 17/029,778

(22) Filed: Sep. 23, 2020

(65) Prior Publication Data

US 2021/0095354 A1   Apr. 1, 2021

Related U.S. Application Data

(60) Provisional application No. 62/906,954, filed on Sep. 27, 2019.

(51) Int. Cl.
*C21B 13/00* (2006.01)
*C21B 11/02* (2006.01)
*C21B 13/02* (2006.01)

(52) U.S. Cl.
CPC .......... *C21B 13/0073* (2013.01); *C21B 11/02* (2013.01); *C21B 13/02* (2013.01);
(Continued)

(58) Field of Classification Search
CPC ..... C21B 13/0073; C21B 11/02; C21B 13/02; C21B 2100/22; C21B 2100/44;
(Continued)

(56) References Cited

U.S. PATENT DOCUMENTS 4,376,648 A * 3/1983 Ohtawa ............... C21B 13/0073
75/498
4,756,750 A * 7/1988 Bixler ................. C21B 13/0073
75/497

(Continued)

FOREIGN PATENT DOCUMENTS

AR    010018 A1    5/2000
AR    089435 A1    8/2014
(Continued)

OTHER PUBLICATIONS

Jayson Ripke and John Kopfle, Midrex H2: Ultimate Low CO2 Ironmaking and its place in the new Hydrogen Economy, Midrex, Sep. 2017 (Year: 2017).*

(Continued)

*Primary Examiner* — Brian D Walck
*Assistant Examiner* — Danielle Carda
(74) *Attorney, Agent, or Firm* — Clements Bernard Walker; Christopher L. Bernard

(57) ABSTRACT

A direct reduction method/system, including: adding variable amounts of natural gas, hydrogen, and a carbon-free oxidizing gas to a feed gas stream upstream of a reformer; reforming the feed gas stream in the reformer to form a reformed gas stream, and delivering the reformed gas stream to a shaft furnace, where the reformed gas stream is used to reduce a metallic ore material to a direct reduced metallic material. The feed gas stream includes a top gas stream recycled from the shaft furnace. Optionally, the carbon-free oxidizing gas includes steam and the method further includes controlling a steam flow rate of the steam to maintain a maximum k-factor value of the feed gas stream of 0.74 or lower. Optionally, the variable amount of hydrogen is selected to replace 20-90% of the natural gas by fuel (Continued)

value. The variable amount of hydrogen is selected based upon an available supply of hydrogen.

13 Claims, 2 Drawing Sheets

(52) U.S. Cl.
CPC ...... *C21B 2100/22* (2017.05); *C21B 2100/44* (2017.05); *C21C 2200/00* (2013.01)

(58) Field of Classification Search
CPC ............ C21B 2100/24; C21B 2100/26; C21C 2200/00; Y02P 10/134; Y02P 10/143
USPC .......................................................... 75/707
See application file for complete search history.

(56) References Cited

U.S. PATENT DOCUMENTS

| | | | |
|---|---|---|---|
| 6,027,545 | A | 2/2000 | Villarreal-trevino |
| 2013/0205951 | A1 | 8/2013 | Meissner et al. |
| 2015/0259760 | A1* | 9/2015 | Eder .......................... C01B 3/02 75/505 |
| 2018/0119237 | A1* | 5/2018 | Voelker .................... C21B 7/16 |

FOREIGN PATENT DOCUMENTS

| | | |
|---|---|---|
| AR | 092164 A1 | 3/2015 |
| AR | 093480 A1 | 6/2015 |
| AR | 098548 A1 | 6/2016 |
| AR | 103190 A1 | 4/2017 |
| CN | 102712959 A | 10/2012 |
| CN | 103525966 A | 1/2014 |
| CN | 104245963 A | 12/2014 |
| CN | 104662177 A | 5/2015 |
| CN | 106521157 A | 3/2017 |
| EP | 2664681 A1 | 11/2013 |
| WO | 2013013295 A1 | 1/2013 |
| WO | 2013093640 A2 | 6/2013 |
| WO | 2014040990 A2 | 3/2014 |

OTHER PUBLICATIONS

Jul. 19, 2022 First Examination Report issued in corresponding International Application No. 202217017024.
Nov. 24, 2020 International Search Report issued on International Application No. PCT/US2020/052373.
Nov. 2, 2022 Office Action issued in corresponding CN Application No. CN202080066593.5.
Substantive Examination Report issued in corresponding Argentine Patent Application No. 200102683.

\* cited by examiner

DIRECT REDUCTION PROCESS UTILIZING HYDROGEN

CROSS-REFERENCE TO RELATED APPLICATION

The present disclosure claims the benefit of priority of U.S. Provisional Patent Application No. 62/906,954, filed on Sep. 27, 2019, and entitled "MIDREX PROCESS UTILIZING HYDROGEN," the contents of which are incorporated in full by reference herein.

TECHNICAL FIELD

The present disclosure relates generally to the direct reduction (DR) and steelmaking fields. More particularly, the present disclosure relates a method and system for converting a DR process, such as a MIDREX process or the like, utilizing natural gas to a DR process utilizing a variable mixture of natural gas (NG) and hydrogen (H2), resulting in direct reduced iron (DRI) having reduced carbon content and lower overall carbon dioxide (CO2) emissions.

BACKGROUND

The current MIDREX NG and similar processes utilize a highly-optimized reformer to generate syngas from NG for the reduction of iron ore. Such processes emit a large amount of CO2 due to the presence of carbon in the NG. Specific efforts are sought to decarbonize parts of the steel industry, as different regions look to reduce their CO2 emissions. One such effort is to replace feed NG with H2. While other methods and systems exist to do this, most require a total upfront replacement of both the reducing gas source and equipment. This places considerable limits on the adoption of H2 as the reducing gas source, as H2 is not yet economically viable and there exist significant uncertainties in the timeline and growth of the H2 supply. One key challenge is that the H2 supply may be subject to fluctuations of renewable energy sources, such as solar and wind. Under these conditions, the standard MIDREX and similar plant flowsheets are unable to operate with H2 without dramatically impacting DRI quality, limiting reformer life, and degrading catalyst stability. Thus, the problems to be solved include: operating a conventional DR NG plant with an intermittent H2 supply; effectively transitioning existing DR NG plants to H2-based reduction; and protecting equipment during such transitions.

SUMMARY

In one illustrative embodiment, the present disclosure provides a direct reduction method, including: adding variable amounts of natural gas, hydrogen, and a carbon-free oxidizing gas to a feed gas stream upstream of a reformer; reforming the feed gas stream in the reformer to form a reformed gas stream, and delivering the reformed gas stream to a shaft furnace, where the reformed gas stream is used to reduce a metallic ore material to a direct reduced metallic material. The feed gas stream includes a top gas stream recycled from the shaft furnace. Optionally, the method also includes one or more of wet scrubbing and compressing the top gas stream. Optionally, the method includes adding the variable amounts of the natural gas, the hydrogen, and the carbon-free oxidizing gas to the feed gas stream upstream of the reformer and a preheater disposed upstream of the reformer. Optionally, the carbon-free oxidizing gas includes steam. Optionally, the method further includes controlling a flow rate of the steam to maintain a maximum k-factor value of the feed gas stream of 0.74 or lower. Optionally, the variable amount of hydrogen is selected to replace 20-90% of the natural gas by fuel value. Alternatively, the variable amount of hydrogen is selected to replace 30-70% of the natural gas by fuel value. The variable amount of hydrogen is selected based upon an available supply of hydrogen. Optionally, the variable amount of hydrogen is selected based upon the available supply of hydrogen from a renewable hydrogen source.

In another illustrative embodiment, the present disclosure provides a direct reduction system, including: external gas sources operable for adding variable amounts of natural gas, hydrogen, and a carbon-free oxidizing gas to a feed gas stream upstream of a reformer operable for reforming the feed gas stream to form a reformed gas stream, and a shaft furnace operable for receiving the reformed gas stream and using the reformed gas stream to reduce a metallic ore material to a direct reduced metallic material. The feed gas stream includes a top gas stream recycled from the shaft furnace. Optionally, the system also includes one or more of wet scrubber operable for wet scrubbing and a compressor operable for compressing the top gas stream. Optionally, the external gas sources are operable for adding the variable amounts of the natural gas, the hydrogen, and the carbon-free oxidizing gas to the feed gas stream upstream of the reformer and a preheater disposed upstream of the reformer. Optionally, the carbon-free oxidizing gas includes steam. Optionally, the system further includes a flow controller operable for controlling a flow rate of the steam to maintain a maximum k-factor value of the feed gas stream of 0.74 or lower. Optionally, the variable amount of hydrogen is selected to replace 20-90% of the natural gas by fuel value. Alternatively, the variable amount of hydrogen is selected to replace 30-70% of the natural gas by fuel value. The variable amount of hydrogen is selected based upon an available supply of hydrogen. Optionally, the variable amount of hydrogen is selected based upon the available supply of hydrogen from a renewable hydrogen source.

The hydrogen and natural gas ratios are determined by the total energy requirements to produce DRI at a specified product quality and the availability of hydrogen. The typical product qualities that are controlled for are percent metallization, that is the amount of metallic iron as a percent by weight of the total iron, and product carbon, that is the amount of carbon in the product by weight percent. Sufficient flow of gas in the inlet feed is required to ensure that reducing gas quality is maintained and energy requirements are met in the furnace to drive the reducing reactions to achieve metallization. The percent metallization is the main driver as it determines the amount of reductant required to remove the oxygen from the iron oxide. The total process energy requirements, including carbon addition, account for ~70% of the energy required. The remaining ~30% is mainly sensible heat losses from various process steps, such as at the top gas scrubber or from the flue gas stack. The combination and selection of the natural gas and hydrogen flowrate will depend on hydrogen availability, costs associated with CO2 emissions, and desired product carbon.

BRIEF DESCRIPTION OF THE DRAWING

The present disclosure is illustrated and described with reference to the various drawings, in which like reference numbers are used to denote like system components/method steps, as appropriate, and in which.

DETAILED DESCRIPTION OF ILLUSTRATIVE EMBODIMENTS

The present disclosure relates generally to an improvement of the Midrex NG and similar processes for the reduction of iron ores. The overall process described herein presents modifications to the associated plants that allow for on-stream variation of the fuel gas source for the reducing gas feed. In one illustrative embodiment, H2 gas is fed interchangeably with NG to the process depending on hour-to-hour changes in H2 availability. This process stands in contrast with other processes designed for specific fuel compositions.

Figure 1:
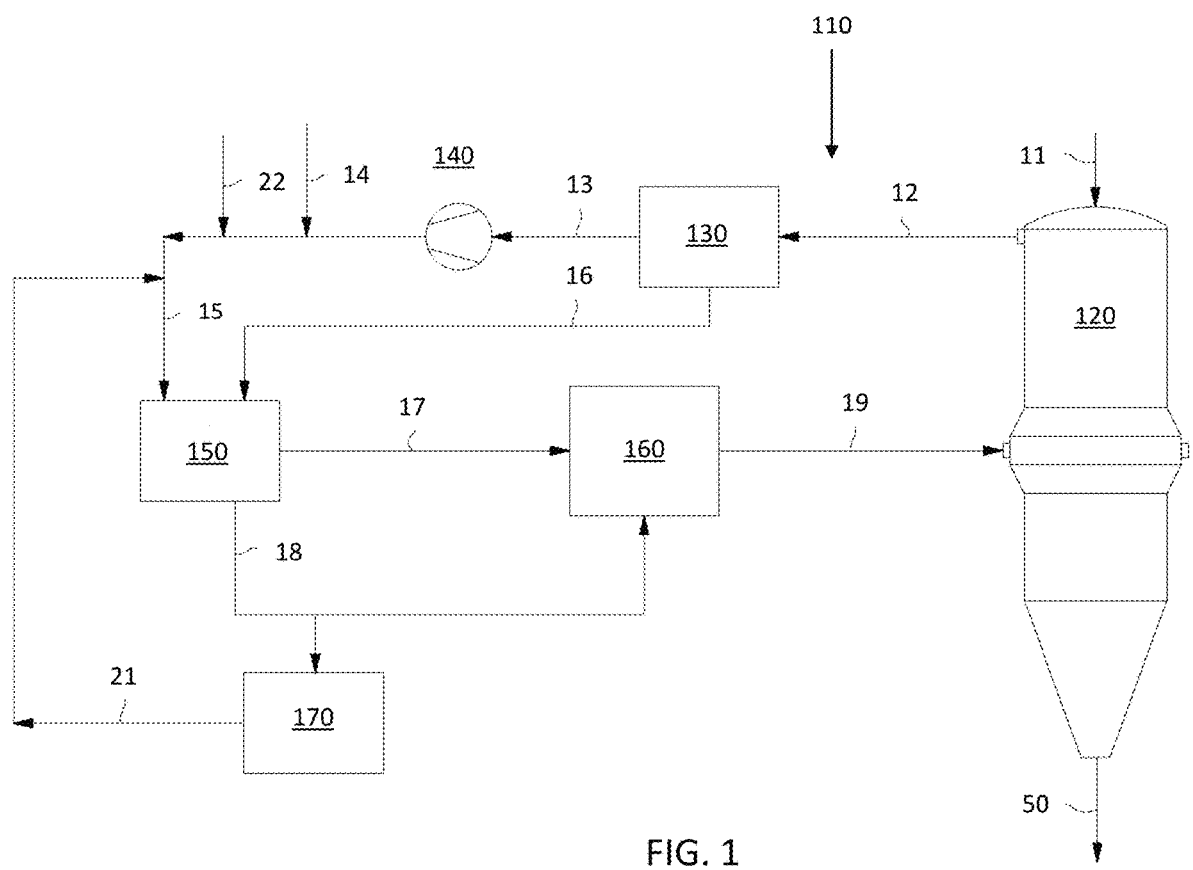
FIG. 1 is a schematic diagram illustrating one embodiment of the H2-based direct reduction process of the present disclosure.

Referring now specifically to FIG. 1, in one illustrative embodiment, a flow diagram of the DR process 110 of the present disclosure is provided. Iron oxide 11 enters via the top of the shaft furnace 120, where it reduces to DRI from reactions with H2 and carbon monoxide (CO). The DRI leaves the shaft furnace via gravity as cold DRI (CDRI), hot DRI (HDRI), hot briquetted iron (HBI), etc. 50. These processes are well known to those of ordinary skill in the art and are not described in greater detail here. Low pressure spent reducing gas 12 (also referred to as top gas) with a temperature of about 350° C. exits from the top of the shaft furnace 120 and is sent to a wet scrubber 130 for removal of dust and carry-over fines. After dedusting, the top gas 12 is split into two streams; process gas 13 and top gas fuel 16. The process gas 13 is recycled and compressed in a compressor 140, to pressure of about 2.0 bar g with a temperature of about 150° C. NG 14, H2 22, and steam 21 are then added to the process gas 13. The NG 14 has a temperature of about 25° C., the H2 22 has a temperature of about 25° C., and the steam 21 has a temperature of about 300° C. This feed gas 15 is preheated to a temperature of about 560° C. in a heat recovery unit 150 and the preheated feed gas 17 is sent to the reformer 160. The reformed gas 19, with a pressure of about 1.8 bar g and a temperature of about 950° C., is sent to the shaft furnace 120. The top gas fuel 16 is used as burner fuel 18 for the reformer 160 or optionally the steam boiler 170. In this illustrative embodiment, external gases 14, 22, and 21 are added to the feed gas 15 and are mixed into the feed gas 15 upstream of the heat recovery unit 150, but they can also be fed into the preheated feed gas stream 17 downstream of the heat recovery unit 150, and upstream of the reformer 160. The flow of steam 21 is controlled based on the inlet chemistry of the preheated feed gas stream 17 at the inlet of the reformer 160 and adjusts depending on the availability of H2 22.

Here, the preferred chemistry of the preheated feed gas stream 17 at the inlet of the reformer 160 is mixture of hydrogen, carbon monoxide, carbon dioxide, water and natural gas, with a temperature of about 450-600° C. and a pressure of about 1.6-1.9 bar g. The preferred chemistry of the reformed gas 19 at the outlet of the reformer 160 is predominately hydrogen and carbon monoxide, with a gas quality of >10, a temperature of about 850-1000° C. and a pressure of about 1.7-2.0 bar g. The amount of NG 14 added to the feed gas 15 is based on the total energy requirements to produce DRI at the specified production rate and quality. Likewise, the amount of H2 22 added to the feed gas 15 is based on availability of the hydrogen source and the energy requirements to produce DRI at the specified production rate and quality. Likewise, the amount of steam 21 added to the feed gas 15 is based on chemistry requirements to prevent carbon degradation at the inlet of the reformer. These additions of external gases 14, 22, and 21 are variable and may fluctuate based on chemistry preferences and H2 22 availability in general. The feed mix composition of natural gas 14 and hydrogen 22 is determined by the total energy requirements of the reduction process and to a lesser extent the flows required to tailor the product carbon. For the conventional natural gas based process, the energy needed is about 2.5 net Gcal per ton product. For small variations of hydrogen input, a mol of hydrogen replaces roughly 0.3 mols of natural gas due to their differing net heating values of 2500 kcal/Nm3 for hydrogen and 8500 kcal/Nm3 for natural gas. However, as the hydrogen input increases along the full range of replacement, energy is no longer needed for the reforming of natural gas and the total requirement approaches about 1.8 net Gcal per ton product with full replacement. For example, a flow of 440 $Nm^3$ of hydrogen per ton product is able to supply ~50% of the new total energy requirement to produce one ton of DRI. The remaining ~50% of the energy is supplied by natural gas at a rate of ~140 $Nm^3$ of natural gas per ton product. Other ratios can be selected via similar means depending on the hour to hour availability of hydrogen. In addition to the reduction energy requirements, there are a few subsystems that use natural gas. The most important is the natural gas added to achieve the desire product carbon. An example subsystem is transition zone natural gas addition, or natural gas that is added directly to the shaft furnace below the bustle. The transition zone natural gas flowrate can vary greatly from 10-60 $Nm^3$ of natural gas per ton product depending on desired product carbon, solid feed material carburizing characteristics and furnace operation. In order to maintain the desired product carbon, a similar range of natural gas is required even as hydrogen is added to the process. Since carbon deposition is dependent on the methane and CO concentrations, in some cases the natural gas feed may increase in these systems to maintain the same product carbon. In general, this effect typically occurs in the higher natural gas replacement rates. The heat recovery efficiency also impacts the total energy required and thus influences the selection of feed gas mix. In general, due to the fixed in-place equipment, the efficiency for heat recovery changes as higher hydrogen addition replaces the natural gas feed. The impact of hydrogen addition to the conventional MIDREX NG process is discussed in detail later in the method disclosure.

The process of the present disclosure has key advantages over conventional reduction processes. The conventional NG process requires tight control of feed flow and composition. Abrupt changes can have dire effects on the plant: clustering in the shaft furnace, reformer tube degradation, etc. The most significant of these is the catastrophic deactivation of catalyst that occurs when carbon deposits on and physically breaks down the catalyst.

In the present disclosure, the controlled introduction of water vapor to the feed gas mitigates the above effects while minimizing disruption to product iron quality. This, in effect, allows multiple varying reducing feed gas sources, for example NG and H2, to be used simultaneously when availability is not constant for one or both. Positive effects of this include helping existing NG-based reduction technologies realize the utilization of H2 from renewable sources as a method for reducing CO2 emissions. The present disclosure can be used in different scenarios, such as: H2 sources that have variable production rates, such as solar or wind-based H2 generation; or the stepwise implementation of fixed H2 production, such as electrolysis. This allows for flexibility in the fuel source that existing NG-based plants can use; specifically H2 from green sources where supply will vary based on daily changes, such as solar or wind.

For NG-based iron reduction processes, NG is generally reformed into syngas, which in turn reacts with iron oxide to product DRI. The basic methane reforming reactions are:

$$CH_4 + H_2O \leftrightarrow CO + 3H_2 \tag{1}$$

$$CH_4 + CO_2 \leftrightarrow 2CO + 2H_2 \tag{2}$$

In principle, this means that H2 can directly replace NG in the process feed gas. However, the affinity for carbon deposition in the reformer needs to be considered. Gasses with higher carbon content can lead to more chance of deposition, but this alone is insufficient to determine carbon formation. Of the different carbon reactions, the following are the ones most relevant for consideration:

$$2CO \leftrightarrow C(s) + CO_2 \tag{3}$$

$$CO + H_2 \leftrightarrow C(S) + H_2O \tag{4}$$

Because of equation (4), the presence of H2 or CO increases the favorability of carbon. Water, on the other hand, prevents the formation of carbon. CO2 tends to have little effect on shifting carbon favorability because it reacts with methane to produce CO, thereby nullifying its response as an oxidant. The equilibrium constant, as defined by activity, for equation (4) is:

$$K_{eq} = \frac{\{H_2O\}}{\{CO\}\{H_2\}} \tag{5}$$

From commercial experience, MIDREX has developed a simplified version of the equilibrium constant as defined in equation (6). This equation, referred to as the k-factor, is defined as follows, where $x_I$ is the respective mol fraction of the gas I in the gas composition and excludes the system pressure terms:

$$k\text{-factor} = \frac{x_{CO} x_{H_2}}{x_{H_2O}} \tag{6}$$

This equation helps determine the likelihood of carbon deposition. Generally, through commercial experience and research, plants have been able to operate with k-factors around 0.5, with the theoretical maximum being 0.74.

Figure 2:
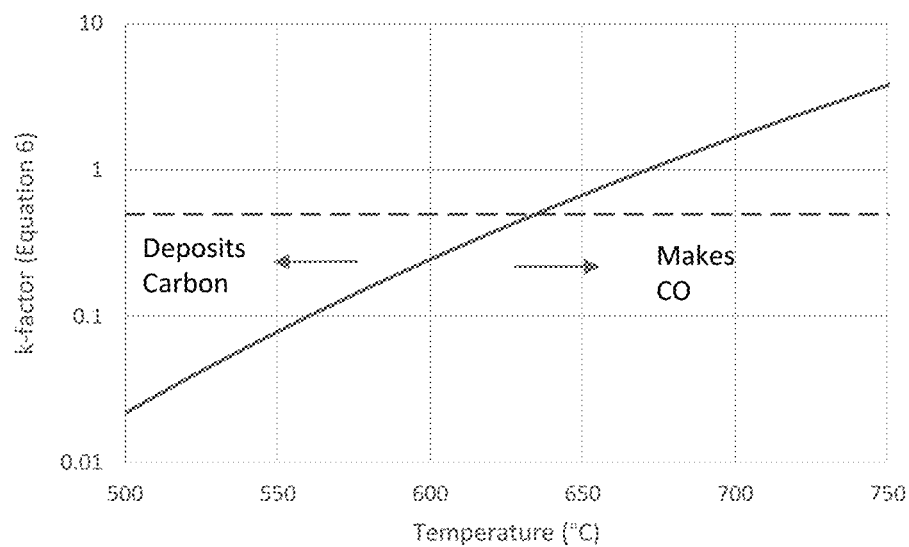
FIG. 2 is a k-factor curve for a water-carbon reaction.

For conventional technology, the reformer inlet operates within the region where carbon deposition is thermodynamically favored. This method of operation requires fine control over the temperature and composition of the inlet gas to prevent carbon deposition from occurring. The catalyst undergoes a sulfur passivation process to decrease its activity at the tube inlet, where the carbon reactions are heavily favored due to the lower temperature. Lower activity allows the feed gas to remain out of equilibrium until the gas has sufficiently heated to no longer favor carbon deposition. Because the system is out of equilibrium, each carbon reaction must be evaluated separately for safe operation of the reformer. By commercial experience, equation (4) is the most constraining. As mentioned before, and as illustrated in FIG. 2, the MIDREX reformer operates with a k-factor of 0.5 (dashed line) for the NG-based flowsheet. The carbon deposit region is favored by equilibrium in the <650° C. region of FIG. 2, which is a typical temperature region of feed gas preheats.

The combination of these factors means that special consideration must be made when adding H2 with partial replacement of NG. Adding external H2 further pushes the reaction towards carbon deposition. The only way to counter this is with a higher water content at the reformer inlet.

In the conventional process, water content is determined by the saturation condition at the process gas scrubber. There, process water is used to dedust, cool, and condense excess water from the top gas. Because of constraints within the system, the operating temperature is typically in the range of 55-65° C. This limits the amount of water present in the process gas, which in turn limits the amount of H2 that can be added and achieve k-factors below 0.7. To safely operate at all ranges of H2 addition, more water needs to be added than can be achieved from the conventional scrubber operating condition. Thus, the conventional MIDREX NG flowsheet can handle a maximum of 200 Nm³ of H2 per ton DRI produced to the process loop without adverse effects at the reformer. This represents only a replacement of roughly 20% NG by fuel value in the traditional process. The conventional technology can also operate on the H2-rich side, replacing 550-650 Nm³ of H2 per ton DRI, or roughly 70% of the NG with H2 by fuel value. However, this can only be done after a lengthy shutdown to modify existing equipment. The remaining 30% of the plant fuel is used to feed the reformer burners, but this fuel is difficult to replace. The burners used in the furnace are sensitive to the molecular weight of the gas and difficult to turn down, limiting fuel flexibility in this area.

In an illustrative embodiment of the present disclosure, the steam generation system adds stream directly to the process gas. This steam addition allows for the feed gas water composition to be maintained directly, independent of the top gas scrubber dust removal requirements. With this inclusion, the present disclosure can freely change between low, medium and high addition of H2 dependent on the availability from an external supply, unlike the conventional process. This is illustrated in FIG. 1, with the steam generation system. The steam requirements are low pressure steam, 5 bar g, with a temperature of >160° C. If any external sources of such steam are available, then the steam generation system is not required. The location in FIG. 1 is the preferred location of the steam addition; downstream of the process gas compressor and upstream of the reformer, but so long as steam is added upstream of the reformer and achieves good mixing then the addition is acceptable. The steam addition allows for this embodiment to provide sufficient water to create a steady value for the k-factor even with hydrogen additions in excess of 200 Nm³ of hydrogen per ton product. Further, control action for steam valves allows for quick and precise control of the water content to take full advantage of changes in H2 availability throughout the day.

The present disclosure requires additional changes to equipment design and control requirements. Specifically, the process gas compressor and heat recovery unit are greatly impacted. Solutions to these problems already exist in the art and are worth mentioning here. As H2 is added, the reduction reactions become more endothermic. With a fixed energy requirement to achieve the same DRI quality (metallization, carbon, etc.), the endothermic H2 reactions in the furnace require more sensible heat than would normally be provided by reaction heat due to the CO reduction reactions. This means that the reducing gas flowrate needs to increase as H2 is added as the reducing gas temperature is limited by what the solid material (DRI) can handle (typically <900° C. is the maximum achievable bed temperature before clustering becomes an issue). This, in turn, means that the process gas compressor will be required to handle the larger reducing gas flowrate, as well as the changes to the process gas molecular weight as H2 is added to the flowsheet. Furthermore, considerations are also required due to the large variation between molecular weights, especially for the operation of centrifugal type compressors. Steam added downstream of the progress gas compressor would unload the total gas flow requirements for the unit.

The plant heat recovery is affected due to the decreased flue gas from the reformer. The main driver for this effect is that, as external hydrogen is added, less reforming is required. The net result is that the fuel gas flowrate (post-combustion top gas fuel and burner natural gas) decreases as hydrogen is added. This has a large impact on the amount of recoverable waste heat that the heat recovery unit. The heat recovery unit is a series of tubular heat exchangers, each with fixed heat transfer coefficients and areas. As the flue gas flowrate decreases, the amount of recoverable waste heat also decreases, thus, due to the fixed heat transfer geometry, the preheats of the various process streams, such as feed gas, also decrease. A major consideration in the conventional MIDREX NG process and the heat recovery design is to maintain a flue gas stack temperature of >180° C., ideally above 250° C., to protect downstream equipment, such as hot fans, from the detrimental effects of acid gases, such as H2SO4, that can develop at these lower temperatures. This consideration is still required, as H2 is added to the flowsheet because sulfur is removed from the solid product in the reduction process, so these acid gas reactions can still occur. The solution to the changing fuel source for the heat recovery piece of equipment includes individual bundle bypass or dilution air in order to maintain proper bundle and stack temperatures.

The transition period between NG-based reduction and H2-based reduction requires unique considerations if existing facilities want to take advantage of decreasing CO2 emissions via external H2. The current embodiment considers these types of process and equipment constraints in order to fully utilize H2 addition to a conventional MIDREX NG plant or the like. The present disclosure allows the conventional MIDREX NG flowsheet or the like to operate with intermittent hydrogen availability with the possibility to convert to complete H2-based reduction capabilities.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A direct reduction method, comprising:
adding via separate streams variable amounts of natural gas, hydrogen, and a carbon-free oxidizing gas to a feed gas stream upstream of a reformer, and a preheater disposed upstream of the reformer, wherein the stream of the variable amount of hydrogen is operable to replace 20-90% of the natural gas by fuel value;
reforming the feed gas stream in the reformer to form a reformed gas stream, and delivering the reformed gas stream to a shaft furnace, where the reformed gas stream is used to reduce a metallic ore material to a direct reduced metallic material wherein the carbon-free oxidizing gas comprises steam, and the direct reduction method further comprises controlling a steam flow rate of the steam to maintain a maximum k-factor value of the feed gas stream of 0.74 or lower, defined by an equation wherein $x_i$ is the respective mol fraction of the gas i in the gas composition:

$$\text{k-factor} = \frac{x_{CO} x_{H_2}}{x_{H_2O}}.$$

2. The direct reduction method of claim 1, wherein the feed gas stream comprises a top gas stream recycled from the shaft furnace.

3. The direct reduction method of claim 2, further comprising one or more of wet scrubbing and compressing the top gas stream.

4. The direct reduction method of claim 1, wherein the variable amount of hydrogen is selected to replace 30-70% of the natural gas by fuel value.

5. The direct reduction method of claim 1, wherein the variable amount of hydrogen is selected based upon an available supply of hydrogen.

6. The direct reduction method of claim 5, wherein the variable amount of hydrogen is selected based upon the available supply of hydrogen from a renewable hydrogen source.

7. A direct reduction system, comprising:
external gas sources operable for adding in separate streams variable amounts of natural gas, hydrogen, and a carbon-free oxidizing gas to a feed gas stream upstream of a reformer operable for reforming the feed gas stream to form a reformed gas stream, and a preheater disposed upstream of the reformer, wherein the stream of the variable amount of hydrogen is operable to replace 20-90% of the natural gas by fuel value, and the carbon-free oxidizing gas comprises steam,
a shaft furnace operable for receiving the reformed gas stream and using the reformed gas stream to reduce a metallic ore material to a direct reduced metallic material, and
a flow controller operable for controlling a steam flow rate of the steam to maintain a maximum k-factor value of the feed gas stream of 0.74 or lower, defined by an equation wherein $x_i$ is the respective mol fraction of the gas i in the gas composition:

$$\text{k-factor} = \frac{x_{CO} x_{H_2}}{x_{H_2O}}.$$

8. The direct reduction system of claim 7, wherein the feed gas stream comprises a top gas stream recycled from the shaft furnace.

9. The direct reduction system of claim 8, further comprising one or more of wet scrubber operable for wet scrubbing and a compressor operable for compressing the top gas stream.

10. The direct reduction system of claim 7, wherein the stream of the variable amount of hydrogen is operable to replace 30-70% of the natural gas by fuel value.

11. The direct reduction system of claim 7, wherein the variable amount of hydrogen is selected based upon an available supply of hydrogen.

12. The direct reduction system of claim 11, wherein the variable amount of hydrogen is selected based upon the available supply of hydrogen from a renewable hydrogen source.

13. The direct reduction system of claim 7, wherein the hydrogen is configured to be fed interchangeably with the natural gas depending on hour-to-hour changes in hydrogen availability.

\* \* \* \* \*